US012379157B2

(12) United States Patent
Vallet Xicoy

(10) Patent No.: US 12,379,157 B2
(45) Date of Patent: Aug. 5, 2025

(54) SYSTEM FOR CONTROLLING THE FREEZE-DRYING PROCESS IN A FREEZE DRYER WITH A PLATE STACK SYSTEM AND A METHOD FOR GENERATING A DESIGN SPACE

(71) Applicant: COMPLIANCE CONSULTING AND ENGINEERING SERVICES, S.L., Barcelona (ES)

(72) Inventor: Jaume Vallet Xicoy, Barcelona (ES)

(73) Assignee: COMPLIANCE CONSULTING AND ENGINEERING SERVICES, S.L. (ES)

( * ) Notice: Subject to any disclaimer, the term of this patent is extended or adjusted under 35 U.S.C. 154(b) by 0 days.

(21) Appl. No.: 18/868,723

(22) PCT Filed: Jun. 28, 2022

(86) PCT No.: PCT/ES2022/070407
§ 371 (c)(1),
(2) Date: Nov. 22, 2024

(87) PCT Pub. No.: WO2024/003424
PCT Pub. Date: Jan. 4, 2024

(65) Prior Publication Data
US 2025/0129984 A1 Apr. 24, 2025

(51) Int. Cl.
*F26B 5/06* (2006.01)
*F26B 21/10* (2006.01)
*F26B 25/22* (2006.01)

(52) U.S. Cl.
CPC ................ *F26B 5/06* (2013.01); *F26B 21/10* (2013.01); *F26B 25/22* (2013.01)

(58) Field of Classification Search
CPC ............. F26B 5/06; F26B 21/10; F26B 25/22
(Continued)

(56) References Cited

U.S. PATENT DOCUMENTS 2,803,888 A * 8/1957 Cerletti ..................... F26B 5/06 34/305
3,078,586 A * 2/1963 Rey ........................... F26B 5/06 34/92
(Continued)

FOREIGN PATENT DOCUMENTS

CA 2949752 A1 * 11/2015 ........... A61K 31/715
CN 106679338 A 5/2017
(Continued)

OTHER PUBLICATIONS

International Search Report in PCT Application No. PCT/ES2022/070407 mailed May 22, 2023, 6 pages.

*Primary Examiner* — Stephen M Gravini

(57) ABSTRACT

The present invention relates to a system suitable for controlling the freeze-drying process in a freeze dryer (1) with a hanging plate stack system (2) comprising at least one heatable plate (3), wherein the plate stack (2) hangs either from another heatable plate (3) or from an upper pressing plate (4), wherein each heatable plate (3) of the plate stack (2) is coupled to each other or to the upper pressing plate (4) by mechanical connection means (5), and it also relates to a method for monitoring and controlling the freeze-drying process comprising the use of said system.

33 Claims, 5 Drawing Sheets

(58) Field of Classification Search
USPC .......................................................... 34/92, 284
See application file for complete search history.

(56) References Cited

U.S. PATENT DOCUMENTS

| | | | | |
|---|---|---|---|---|
| 3,280,471 | A | 10/1966 | Cole et al. | |
| 7,640,756 | B2 * | 1/2010 | Brahmbhatt | F26B 5/06 34/301 |
| 8,529,960 | B2 * | 9/2013 | Campbell | A61L 27/3604 424/529 |
| 9,003,676 | B2 * | 4/2015 | Yarborough | A61M 5/002 34/287 |
| 11,077,060 | B2 * | 8/2021 | Andrade De Freitas | A61K 9/4866 |
| 11,648,204 | B2 * | 5/2023 | Carite | A61K 9/19 34/284 |
| 11,668,525 | B2 * | 6/2023 | Knight | A01N 1/144 34/284 |
| 11,674,751 | B2 * | 6/2023 | Deprez | F26B 5/06 34/60 |
| 11,723,870 | B1 * | 8/2023 | Harkins, Jr. | F26B 5/06 34/284 |
| 11,732,964 | B2 * | 8/2023 | Patel | F26B 25/063 34/237 |
| 11,781,811 | B2 * | 10/2023 | Knight | B01L 1/02 34/284 |
| 2019/0285342 | A1 | 9/2019 | Thompson et al. | |

FOREIGN PATENT DOCUMENTS

| | | | | |
|---|---|---|---|---|
| CN | 206670234 | U | 11/2017 | |
| DE | 102004007526 | A1 | 9/2005 | |
| DE | 102006019641 | A1 | 11/2006 | |
| EP | 1348431 | A1 * | 10/2003 | A61K 31/335 |
| GB | 1587409 | A | 4/1981 | |
| JP | H02169984 | A | 6/1990 | |
| WO | 2006013360 | A1 | 2/2006 | |
| WO | WO-2015177622 | A1 * | 11/2015 | A61K 31/715 |

* cited by examiner

SYSTEM FOR CONTROLLING THE FREEZE-DRYING PROCESS IN A FREEZE DRYER WITH A PLATE STACK SYSTEM AND A METHOD FOR GENERATING A DESIGN SPACE

TECHNICAL FIELD

The present invention relates to a system suitable for controlling the freeze-drying process in a freeze dryer with a plate stack system, and it also relates to a method suitable for generating a design space and a method for monitoring and controlling the freeze-drying process comprising the use of said system, such that they can be used in the commercial manufacture of a pharmaceutical, cosmetic or food product.

STATE OF THE ART

An important step towards manufacturing many pharmaceutical products for injectable or parenteral use is freeze-drying. Freeze-drying is also a key technology for the GMP regulated sector.

Freeze-drying is a physical-chemical process in which water is removed from a product to promote its stability. This technique is used especially for injectable products or drugs which can be highly unstable in aqueous solutions and must be stored in freezers at low temperatures. In the freeze-drying process, for example, a vial or ampoule pre-filled with the pharmaceutical product is placed inside a special freeze-drying chamber. First, the product is frozen by lowering the temperature inside the chamber. Subsequently, sublimation of the solvent (usually water) in the previously frozen product is carried out in an atmosphere with a very low solvent vapour pressure. By removing moisture and much of the solvent from the product in this manner, the product is more stable and its useful life can be extended.

Freeze-drying makes it possible to keep these products cold and at room temperature, significantly favouring the logistics of the storage, transport and distribution thereof.

Various methods and systems have been developed to control and monitor freeze-drying cycles, conditions of the process, and the quality of products obtained through freeze-drying.

For example, early designs such as those described in U.S. Pat. No. 3,176,408 describe a freeze-drying apparatus and method for items of the same size and type wherein said items were located in a sealed chamber, a shelf, and a tray prepared to support frozen items to be freeze-dried, means for freeze-drying the items deposited on the tray and means for responding directly to the loss of weight of the items due to sublimation, wherein the apparatus comprises at least two load cells, located under the shelves (see FIGS. 1 and 2), to automatically control said freeze-drying means, wherein said means responding to the loss of weight include a device that varies the pressure inside the chamber. The shelf of the apparatus can have two load cells that are placed under the fixed shelves and are connected to the weight recorder and to a controller by wires. Depending on the measured weight, the heat or pressure supplied to the apparatus may vary.

Later, patent document CN206670234 disclosed a freeze dryer for carrying out a freeze-drying process, which comprised a chamber with three fixed shelves where vials to be freeze-dried were deposited. Said shelves included a resistance strain gauge weighing sensor and a sensor mounting bracket fixedly connected to the centre of each shelf. The bottom of one end of the strain gauge weighing sensor is fixedly connected to the sensor mounting bracket by a mounting bolt. The bottom of the other end of the resistance strain gauge weighing sensor is provided with an adjusting bolt to adjust the height position of the resistance strain gauge load cell; the side of the strain gauge load cell is provided with a sensor output terminal, the sensor. The gauge system was used to determine the amount of material resulting from the process by measuring the variation in weight over time. Said apparatus comprised one strain gauge for each shelf.

Said strain gauges were connected to a control device (which could be a PLC) that collected the weight measurements of the gauges and displayed them on a screen. Subsequently, an operator could determine the optimal freeze-drying time based on the weight variations displayed on the screen.

The operator can determine the end of the experiment when directly observing that the value shown on the display screen no longer changes, in addition to observing whether the indicator light 11 lights up. Moreover, the apparatus comprises a timer 12 configured to record the measured weight value of the strain gauge load cell once every 30 minutes until the measured values, for two consecutive times, are stable and the ice in the material is completely sublimated. The light 11 receives the signal from the electronic control unit 13 to light up, which leads the operator to finish the process. This system has the drawback that it limits the control and completion of the process to a manual process carried out by an operator.

The latest publications, such as US2020340743 A, described a non-invasive system and method to monitor and control a freeze-drying process using a network of wireless gas temperature and ambient pressure sensors; in particular, the method makes it possible to determine the sublimation rate of solvent from the vials deposited inside of using an arbitrary mathematical model during the freeze-drying process in real time.

More specifically, US2020340743 A described a system comprising:

- Wireless pressure and gas temperature sensors, a housing fluidly coupled to the ambient environment of the housing, a power supply arranged in the housing, an electronics module, electrically coupled to the power supply, comprising a microcontroller and a wireless transceiver, wherein the wireless pressure sensors together with the electronics module and adapted to provide ambient pressure and gas temperature values, said sensors being located inside different vials that are deposited on the shelves inside the freeze-drying chamber together with the vials containing the product to be freeze-dried. Moreover, the system further comprised a vacuum pump, adapted to change the freeze-drying chamber pressure, a heat exchanger adapted to modify the temperature inside the freeze-drying chamber and wherein A control unit adapted to collect pressure and gas temperature data from one or more wireless pressure sensors and calculate the sublimation rate in a product to be freeze-dried using the pressure temperature and gas data collected.

The control unit of the system calculates the sublimation rate in the follow manner: by applying a predetermined initial limit condition on a channel representing the space adjacent to the tray of the freeze-drying vial inside the freeze-drying chamber, it iteratively minimises a penalty function associated with the difference between the calculated spatial pressure information and that which is collected, which includes: calculating information on the spatial temperature and gas feed at distributed locations of one or more wireless pressures and as temperature sensors, calculating the difference between the calculated spatial pressure information and that which is collected; moreover, it calculates the penalty function for the associated intermediate reference between the collected and calculated spatial pressure information and the associated limit condition, determines a new limit condition that causes the calculated penalty function to be reduced, and calculates the sublimation rate by applying in g the associated limit condition with the penalty function.

Therefore, there is a need to design systems and methods for monitoring the different freeze-drying processes for different industries, which can be applied to different freeze-drying containers and which can also create a design space adjusted to the real conditions of the freeze-drying processes, in addition to being used as a reference or model for predicting future values of the conditions in a container suitable for freeze-drying, for example a vial, during the freeze-drying process.

Likewise, it is also necessary to develop systems and methods that facilitate the identification of the optimal conditions for a routine freeze-drying process, both on a large scale and in small manufactures, or the limits based on which the process can fail in said manufacturing process.

SUMMARY

The system of the first aspect of the present invention is applicable, for example, to the freeze-drying process of injectable products that makes it possible to monitor the parameters that directly compromise the quality of the freeze-dried product, thus being integrated into the quality control of the product by controlling the process according to the "Quality by Design" concept. Likewise, it is also applicable to freeze-dried products for use in food, since they enable the flavour of said products to be preserved over time.

The system of the first aspect of the present invention has the advantages that makes it possible to directly obtain the weight of the plate stack (2) and of the heatable plates, to subsequently calculate the flow of water vapour that is sublimated in the freeze dryer through the use of load cells. Moreover, it makes it possible to obtain critical process parameters to help manufacturers obtain "Design Space" based on "Quality by Design" in a simple and robust way.

Additionally, the system makes it easier to monitor the different freeze-drying processes for different industries, which can be applied to different freeze-drying containers and which can also create a design space adjusted to the real conditions of the freeze-drying processes, in addition to being used as a reference or model for predicting future values of the conditions in a container suitable for freeze-drying, for example a vial, during the freeze-drying process, as well as identifying the optimal conditions for a routine freeze-drying process, both on a large scale and in small manufactures, the limits based on which the process can fail and the limits or ranges to perform validations of said manufacturing process.

Therefore, the system of the first aspect is a system suitable for controlling the freeze-drying process in a freeze dryer (1) with a hanging plate stack system (2) comprising at least one heatable plate (3), wherein the plate stack (2) hangs either from another heatable plate (3) or from an upper pressing plate (4), wherein each heatable plate (3) of the plate stack (2) is coupled to each other or to the upper pressing plate (4) by mechanical connection means (5); wherein said system comprises:

at least one pressure sensor (6) suitable for detecting an absolute pressure in a freeze-drying chamber;

at least one temperature sensor (7) suitable for measuring the temperature of the heatable plates (3);

at least one product temperature sensor (8) suitable for measuring the temperature of the product and for being located inside receptacles suitable for freeze-drying;

at least one strain gauge (9) configured to be located in the upper portion of each heatable plate (3) and/or of the upper pressing plate (4), which comprises the freeze dryer (1);

wherein the at least one strain gauge (9) is coupled to mechanical connection means (5);

a control unit (10) comprising a processor (11) and a display device (12), wherein the control unit (10) is configured to automatically and simultaneously collect and analyse at least the measurements from the sensors (6), (7), (8) and (9) and represent at least one of said measurements on a display device (12) on a work map, the sensors (6), (7), (8) and (9) being in data connection with the control unit (11) through electronic means (13A, 13B, 13C, 13D).

The second aspect of the invention relates to a freeze dryer (1) comprising:

a freeze-drying chamber (14), an upper pressing plate (4), heatable plates (3) suitable for depositing samples, a hanging plate stack system (2) comprising at least one heatable plate (3) for depositing samples suitable for a freeze-drying process, wherein the plate stack (2) hangs either from another heatable plate (3) or from an upper pressing plate (4), wherein each heatable plate (3) of the plate stack (2) is coupled to each other or to the upper pressing plate (4) by mechanical connection means (5);

the system according to claims 1-21; and optionally, wherein the heatable plates (3) of the freeze dryer (1) are movable plates.

The third aspect of the invention relates to a method suitable for generating a design space for a sample, comprising receptacles suitable for freeze-drying which contain a product, during a freeze-drying process inside a freeze-drying chamber of a freeze dryer (1) which comprises the system according to claims 1-22, preferably the freeze dryer (1) according to any of claims

23 and 24, wherein said method comprises:

depositing a sample to undergo a freeze-drying process inside said chamber (14); carrying out a freeze-drying process on said product;

measuring the variation in weight of the sample by using at least one strain gauge (9) at different time intervals throughout the freeze-drying process of step ii);

measuring the temperature of the heatable plates (3) by using temperature sensors (7) at different time intervals throughout the freeze-drying process of step ii);

measuring the temperature of the product of the sample by using temperature sensors (8) at different time intervals throughout the freeze-drying process of step ii);

measuring the absolute pressure inside the freeze-drying chamber at different time intervals throughout the freeze-drying process for step ii);

wherein steps iii), iv), v) and vi) are carried out simultaneously in real time to provide measurements of chamber pressure, temperature of the heatable plates (3), product temperature, and weight variation of the samples, and wherein said measurements are collected by a control unit (10) and at least one of said measurements or the parameters obtained through said measurements by the control unit (10) are represented by a display device (12), on a work map, wherein the work map comprises at least the representation in graphs of said measurements collected by the control unit (10) or of the parameters obtained by the control unit (10), and wherein said graphs represent at least one of the measurements or parameters and optionally establishing the limits of the design space.

The fourth aspect of the invention relates to a method for monitoring and controlling a sample comprising receptacles suitable for freeze-drying which contain a product, routinely during a freeze-drying process inside a freeze-drying chamber (2) of a freeze dryer (1) which comprises the system according to claims 1-22, preferably the freeze dryer (1) according to any of claims 23 and 24, wherein said method comprises at least the following steps:

depositing a sample to undergo a freeze-drying process inside said chamber (14);

carrying out a freeze-drying process on said product;

optionally measuring the variation in weight of the sample by using at least one strain gauge (9) at different time intervals throughout the freeze-drying process of step ii);

measuring the temperature of the heatable plates (3) by using temperature sensors (7) at different time intervals throughout the freeze-drying process of step ii);

optionally measuring the temperature of the product of the sample by using temperature sensors (8) at different time intervals throughout the freeze-drying process of step ii);

measuring the absolute pressure inside the freeze-drying chamber at different time intervals throughout the freeze-drying process for step ii);

wherein steps iii), iv), v) and vi) are carried out simultaneously in real time to provide measurements of chamber pressure, temperature of the heatable plates (3), product temperature, and weight variation of the samples, and wherein said measurements are collected by a control unit (10) and at least one of said measurements or the parameters obtained through said measurements by the control unit (10) are represented by a display device (12), on a work map, wherein the work map comprises at least the representation in graphs of said measurements collected by the control unit (10) or of the parameters obtained by the control unit (10), and wherein said graphs represent at least one of the measurements or parameters;

a. comparing, by using the control unit (10), at least the measurements of temperature of the heatable plates (3) and pressure obtained in the work map for each product during step ii) against values previously obtained in the design space according to the third aspect, for a sample or standard sample, during that same step ii);

b. optionally adjusting, if necessary, the absolute pressure and temperature parameters in the freeze dryer for each process, via the control unit (10) based on the results of step that deviate from the results obtained for the design space for the sample or standard sample.

FIGURES

The foregoing and other advantages and features will be more fully understood from the following detailed description of exemplary embodiments referring to the attached drawings, which should be considered by way of illustration and not limitation, wherein:

FIG. 1 is a graph or representation of a workspace.

FIG. 2. FIG. 2A is a work map (a graph) that represents the relationship between the chamber pressure and the mass flux along with plate temperature isotherms. FIG. 2B is a work map (a graph) that represents the relationship between chamber pressure and mass flux along with product temperature isotherms.

Figure 5:
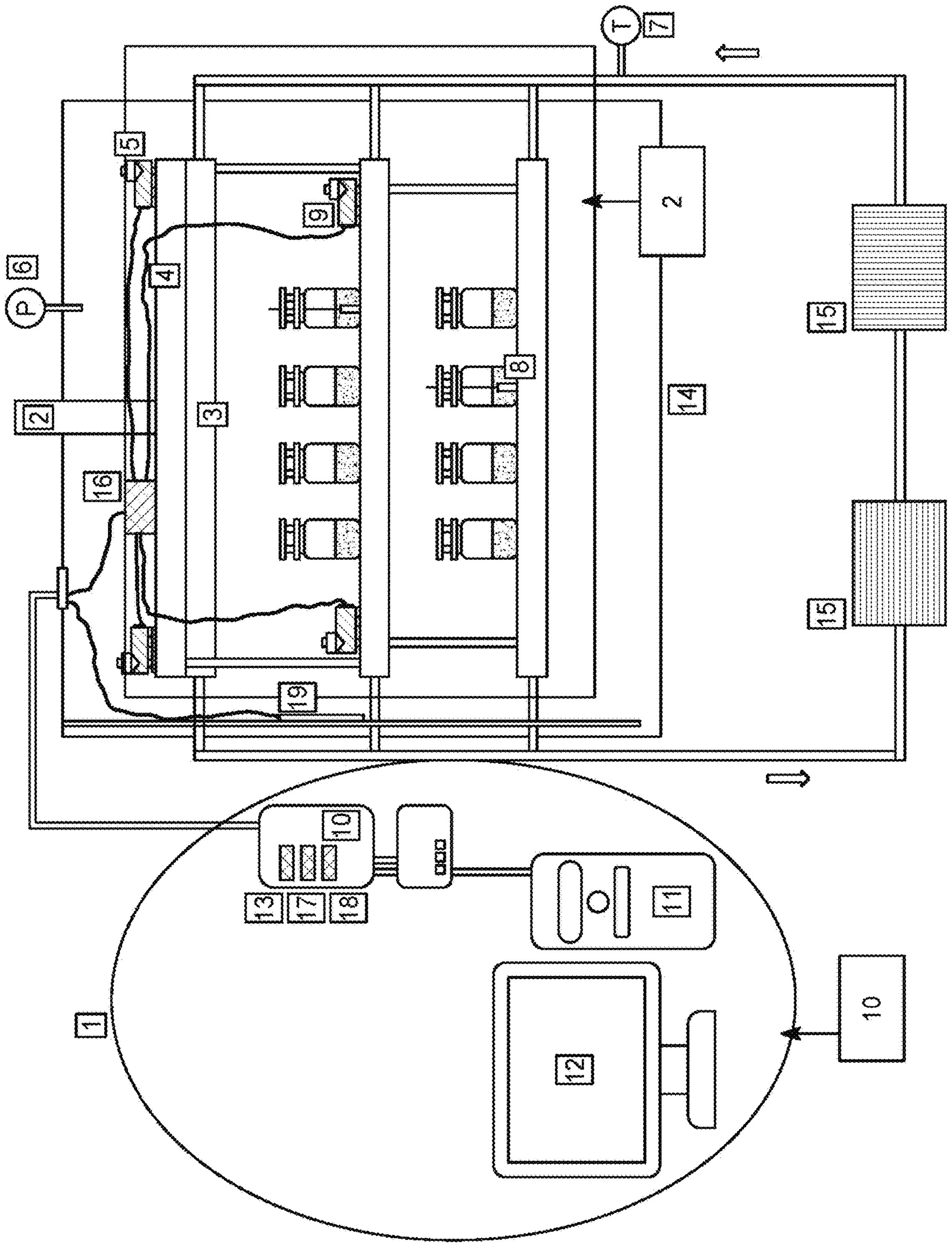

FIG. 5 is a view of an embodiment of a plate stack (2) together with the system of the first aspect of the invention and the freeze dryer of the second aspect with the elements thereof: 1. Freeze dryer, 2. Hanging plate stack, 3. Heatable plate, 4. Upper pressing plate, 5. Mechanical connection means, 6. Pressure sensor, 7. Temperature sensor (heatable plate), 8. Product temperature sensor, 9. Strain gauge, 10. Control unit, 11. It comprises a processor, 12. Display device, 13. Electronic means, 14. Freeze-drying chamber, 15. Heating means, 16. Junction box, 17. Memory for storing data, 18. Battery, 19. Antenna.

DETAILED DESCRIPTION

The system of the first aspect is a system suitable for controlling the freeze-drying process in a freeze dryer (1) with a hanging plate stack system (2) comprising at least one heatable plate (3), wherein the plate stack (2) hangs either from another heatable plate (3) or from an upper pressing plate (4), wherein each heatable plate (3) of the plate stack (2) is coupled to each other or to the upper pressing plate (4) by mechanical connection means (5); wherein said system comprises:

I. at least one pressure sensor (6) suitable for detecting an absolute pressure in a freeze-drying chamber;

II. at least one temperature sensor (7) suitable for measuring the temperature of the heatable plates (3);

III. at least one product temperature sensor (8) suitable for measuring the temperature of the product and for being located inside receptacles suitable for freeze-drying;

IV. at least one strain gauge (9) configured to be located in the upper portion of each heatable plate (3) and/or of the upper pressing plate (4), which comprises the freeze dryer (1); wherein the at least one strain gauge (9) is coupled to mechanical connection means (5);

V. a control unit (10) comprising a processor (11) and a display device (12), wherein the control unit (10) is configured to automatically and simultaneously collect and analyse at least the measurements from the sensors (6), (7), (8) and (9) and represent at least one of said measurements on a display device (12) on a work map, the sensors (6), (7), (8) and (9) being in data connection with the control unit (11) through electronic means (13A, 13B, 13C, 13D).

The system of the first aspect has the advantage that it can be installed and used in large commercial freeze dryers as well as in small laboratory freeze dryers. This has the advantage that it can be installed without affecting the proper functioning of the freeze dryer.

Therefore, in all aspects of the present invention the load cells of the present invention are adapted to be able to work under vacuum conditions, and the most important challenge to overcome is doing so in a very low temperature environment.

In a more preferred embodiment, the system of the first aspect is suitable for freeze dryers comprising movable heatable plates (3).

In another preferred embodiment of the system of the first aspect, the freeze dryer is a freeze dryer with a top piston system.

In another more preferred embodiment, the system of the first aspect is suitable for freeze dryers comprising at least one freeze-drying chamber (14), an upper pressing plate (4), hanging heatable plates (3) suitable for depositing receptacles suitable for freeze-drying, a hydraulic piston, heating means (15), and means for modifying and controlling chamber pressure.

In the context of the present invention, the term sample comprises a receptacle suitable for freeze-drying which contains a product suitable for undergoing a freeze-drying process. Preferably, said product comprises a solvent, a cosmetically or pharmaceutically acceptable active ingredient, or a product suitable for food use. In another preferred embodiment, the receptacle suitable for freeze-drying the sample of any of the aspects of the invention is selected from the list consisting of vials, ampoules, syringes, cartridges, bulk trays, microtubes and flasks.

In the context of the present invention, the term standard sample refers to a sample that can be used as a reference or for calibrating samples for subsequent industrial manufacturing.

Normally, the hydraulic piston offers the possibility of raising and lowering all the heatable plates (3) making up the plate stack (2). When the freeze-dried samples are products deposited in vials, said vials are closed inside the chamber. This is carried out by the hydraulic piston which, when the plates are lowered, presses the upper plate on the caps of each of the vials until they close.

Freeze dryers with a hydraulic piston are frequently used in the pharmaceutical, cosmetic and food industries, for which reason the system of the first aspect is a highly versatile system that can be used in most commercial freeze dryers. Preferably with top piston freeze dryers.

In general, the freeze-drying chamber is the space where the sample that undergoes the freeze-drying process is placed. The sample is located on the heatable plates (3). The set of heatable plates together with the upper pressing plate is called plate stack (2). The plate stack (2) comprises at least one heatable plate (3) hanging from another heatable plate (3) or from an upper pressing plate (4) by mechanical connection means (5). The plate stack (2) can have other hanging heatable plates (3) that in turn hang from the hanging plate (3) immediately above it by mechanical connection means (5).

In general, a freeze dryer (1) further comprises a condenser which can be, for example, a coil that collects all the water vapour that sublimates from the sample deposited in the freeze-drying chamber (14).

In a preferred embodiment, the system of the first aspect comprises at least two strain gauges (9), more preferably, at least four strain gauges (9).

In the context of the present invention, each strain gauge (9) is configured to be coupled to a mechanical connection means (5); said mechanical connection means (5) have the feature that it adapts to the shape of the heatable plates (3) of the freeze dryer. In a preferred embodiment of the system of the first aspect, the at least one strain gauge (9) is configured to be coupled to the upper portion of the mechanical connection means (5) and on the upper portion of the heatable plates (3) or the pressing plate (2), thereby obtaining more precise and reproducible measurements. In another more preferred embodiment of the system of the first aspect, the at least strain gauge (3) is configured to be coupled to the upper portion of the mechanical connection means (5) directly or indirectly through a tool (20).

In the context of the present invention, the tool (20) or compression force transmission structure is located at the junction point between the load cells and the point where this force is produced.

In general, the mechanical connection means (5) are metal elements adapted to connect and support at least the weight of the lower or immediately lower heatable plates (3). The mechanical connection means (5) are configured to support the weight of the immediately lower heatable plates (3), forming a plate stack (2). The mechanical connection means (5) are configured to pass through the heatable plates (3) or the upper pressing plate (4) in such a way that the ends of said means are located above the heatable plate (3) or the upper pressing plate (4), as applicable.

In a particular embodiment, the mechanical connection means (5) are selected from the list consisting of cylindrical rods, preferably selected from hollow or solid cylindrical rods, metal shafts and metal guides. More preferably, the mechanical connection means (5) comprise metals selected from the list consisting of steel and stainless steel.

In a preferred embodiment of the system of the invention, the control unit (10) is external to the freeze dryer and the processor (11) is selected from a CPU or a PLC unit. Preferably, the control unit (10) comprises a processor (11), a network interface, a display device (12) selected from a monitor or screen, a user input device, and a memory unit.

The control unit (10) can be a server, a desktop computer, a laptop computer, a tablet, or any other suitable type of computing device(s).

In another preferred embodiment of the system of the invention, the system can have two control units (10), a control unit external to the freeze dryer (10EA) and another control unit connected to the freeze dryer (10EB), both in data connection with the pressure sensor (6), with the plate temperature sensor(s) (7), with the product temperature sensor(s) (8) and with the at least strain gauge (9), and wherein the external control unit (10EA) is in data connection with the control unit of the freeze dryer (10EB) through the processor (11).

In a preferred embodiment of the system of the invention, the at least strain gauge (9) is configured to measure the weight of the heatable plates (3) and the control unit (10) is configured to calculate the variation in weight of the heatable plates (3) of the freeze dryer. In the system of the invention, each strain gauge (9) is configured to measure the weight of the heatable plates (3) of the freeze dryer. The variation in weight of the heatable plates (3) of the freeze dryer is obtained by the control unit (10) and is used to calculate the mass flux that occurs in the receptacles suitable for freeze-drying during the freeze-drying process, in other words, the mass flux of vapour of the solvent that sublimates from the frozen product.

In a preferred embodiment of the system of the invention, the system further comprises at least one junction box (16) configured to unify the input signal of each strain gauge (9) into a single output signal towards the control unit (10). Preferably, the junction box (16) is an analogue junction box or a digital junction box and/or is located external to the freeze dryer (1). In this way, the signal from each strain gauge load cell is unified and helps to obtain more reliable and reproducible measurement values of the weight of the heatable plates (3) and the weight of the plate stack (2). It also makes system installation easier and helps reduce the risk of equipment damage.

In a more preferred embodiment of the system of the first aspect, the junction box (13) is an analogue junction box or a digital junction box.

In the context of the present invention, the term analogue junction box is understood as a junction box configured to convert the analogue signal of load cells to a digital signal and unify the resulting digital signals into a single output signal.

In the context of the present invention, the term digital junction box is understood as a junction box which is configured to unify the digital input signals of load cells into a single output signal.

In the context of the present invention, the term mass flux or mass flux rate is the mass of substance (solvent or any volatile substance) which sublimates from the frozen product in the freeze-drying container per unit of time which passes through a given surface per unit of time. The unit thereof is mass divided by time; therefore, kilogram/second in SI units.

In the context of the present invention, pressure sensors (6), suitable for detecting an absolute pressure in the freeze-drying chamber. Preferably, the pressure sensors are adapted to withstand temperatures of up to 121° C., to thereby withstand the conditions of periodic sterilization processes.

In a preferred embodiment of the system of the first aspect, the pressure sensor (6) is a capacitive sensor or a Pirani-type sensor. Preferably, the pressure sensor (6) is configured to be located inside the freeze-drying chamber (14) and connected to the control unit (10) by the electronic means (13A).

In a preferred embodiment of the system of the first aspect, the temperature sensors (7) and (8) are selected from the list consisting of thermocouples, Tempris®-type sensors and PT100-type sensors and thermocouples.

Preferably, the pressure and temperature sensors (7) and (8) are adapted to withstand temperatures in a range between-60 to 130° C. and/or be configured to measure pressures between 0.001 and 1 mbar, to thereby withstand the conditions of periodic sterilization processes.

In a preferred embodiment of the system of the invention, said system comprises at least one temperature sensor (8) in a receptacle suitable for freeze-drying. Preferably, the system comprises at least one product temperature sensor (8) located in at least one receptacle suitable for freeze-drying, preferably located inside the receptacle and/or in contact with the product.

In another preferred embodiment of the system of the invention, said system comprises at least one product temperature sensor (8) in at least one receptacle suitable for freeze-drying for each heatable plate (3); in this way, the product temperature measurements are more precise, making it possible to generate a design space better adjusted to the real conditions of the freeze-drying process. More preferably, the product temperature sensors (8) are wireless.

In a preferred embodiment of the system of the invention, the heating means (15) are thermal fluid heating means and the temperature sensor (7) is configured to be located on said heating means (15), for example, coupled with a flange.

In a more preferred embodiment of the system of the first aspect, the system comprises at least one temperature sensor (7) per system, located on the heating means (15) before the entry of said heating means into the heatable plates (3). The temperature of the heating means corresponds to the temperature of the heatable plates (3).

The plate temperature sensor (7) can be located on the thermal fluid heating means (15) or located inside a groove comprised on the thermal fluid heating means (15).

The thermal fluid heating means (15) can be, for example, a collector; therefore, the plate temperature sensor (7) is preferably located at the fluid inlet of said collector. The temperature at the collector inlet corresponds to the temperature of the heatable plates (3).

In another preferred embodiment of the system of the invention, the temperature sensor (7) is configured to be located on the heatable plates (3), more preferably inside the heatable plates (3), thereby obtaining more reliable and precise temperature measurements.

In a more preferred embodiment, the system of the first aspect comprises at least one temperature sensor (7) located on the heating means (15) before the entry of said heating means into the heatable plates (3) and one temperature sensor (7) located on at least one heatable plate (3), preferably inside the heatable plate (3), more preferably on the heating means that run inside the heatable plates (3).

Preferably, the system of the first aspect comprises at least one temperature sensor (7) located in a receptacle suitable for freeze-drying located on one heatable plate (3) for each heatable plate (3) comprising the freeze dryer.

In a more preferred embodiment of the system of the first aspect, the temperature sensors (7) and (8) are wireless and the electronic means (13B and 13C) are wireless. In this way installation is made easier, said installation also being faster and safer since the risk of the electronic means (13B and 13C) being damaged when they are in the form of wires, due to the movement of the plates, is reduced. In another more preferred embodiment of the system of the first aspect, temperature sensors (8) have an externa! memory for storing data (17), an external battery (18) and an external antenna (19) configured to communicate the data to the control unit (10); the antenna (19) is preferably configured to emit a radio signal. The external memory (17) and external antenna (19) can be located on In a preferred embodiment of the system of the first aspect, the electronic means (13A, 13B,13C, 13D) are wireless or digital and are configured to be sterilizable, for example protected with coatings resistant to high temperatures of up to 121° C. and water vapour, to thus withstand the conditions of the periodic sterilization processes.

The second aspect of the invention relates to a freeze dryer (1) comprising:

- a freeze-drying chamber (14),
- an upper pressing plate (4),
- heatable plates (3) suitable for depositing samples,
- a hanging plate stack system (2) comprising at least one heatable plate (3) for depositing samples suitable for a freeze-drying process, wherein the plate stack (2) hangs either from another heatable plate (3) or from an upper pressing plate (4),
- wherein each heatable plate (3) of the plate stack (2) is coupled to each other or to the upper pressing plate (4) by mechanical connection means (5);
- the system according to claims 1-21; and
- optionally, wherein the heatable plates (3) of the freeze dryer (1) are movable plates.

In a preferred embodiment, the freeze dryer (1) of the second aspect is a freeze dryer with a top piston system.

The third aspect of the invention relates to a method suitable for generating a design space for a sample, comprising receptacles suitable for freeze-drying which contain a product, during a freeze-drying process inside a freeze-drying chamber of a freeze dryer (1) which comprises the system according to claims 1-22, preferably the freeze dryer (1) according to any of claims 23 and 24, wherein said method comprises:

depositing a sample to undergo a freeze-drying process inside said chamber (14);

carrying out a freeze-drying process on said product;

measuring the variation in weight of the sample by using at least one strain gauge (9) at different time intervals throughout the freeze-drying process of step ii);

measuring the temperature of the heatable plates (3) by using temperature sensors (7) at different time intervals throughout the freeze-drying process of step ii);

xi. measuring the temperature of the product of the sample by using temperature sensors (8) at different time intervals throughout the freeze-drying process of step ii);

xiii. measuring the absolute pressure inside the freeze-drying chamber at different time intervals throughout the freeze-drying process of step ii);

wherein steps iii), iv), v) and vi) are carried out simultaneously in real time to provide measurements of chamber pressure, temperature of the heatable plates (3), product temperature, and weight variation of the samples, and wherein said measurements are collected by a control unit (10) and at least one of said measurements or the parameters obtained through said measurements by the control unit (10) are represented by a display device (12), on a work map, wherein the work map comprises at least the representation in graphs of said measurements collected by the control unit (10) or of the parameters obtained by the control unit (10), and wherein said graphs represent at least one of the measurements or parameters and optionally establishing the limits of the design space.

In a preferred embodiment of the method of the third aspect, the graphs of the work map represent at least two and/or three of the measurements collected by a control unit (10) and the parameters obtained through said measurements by the control unit (10).

The term work map comprises, for example, the representation of the measurements collected or of the parameters obtained by the control unit (10) in graphs wherein at least one of said measurements or said parameters, or at least two of said measurements and/or said parameters, or at least three of said measurements and/or said parameters obtained by the control unit (10) are represented.

Figure 1:
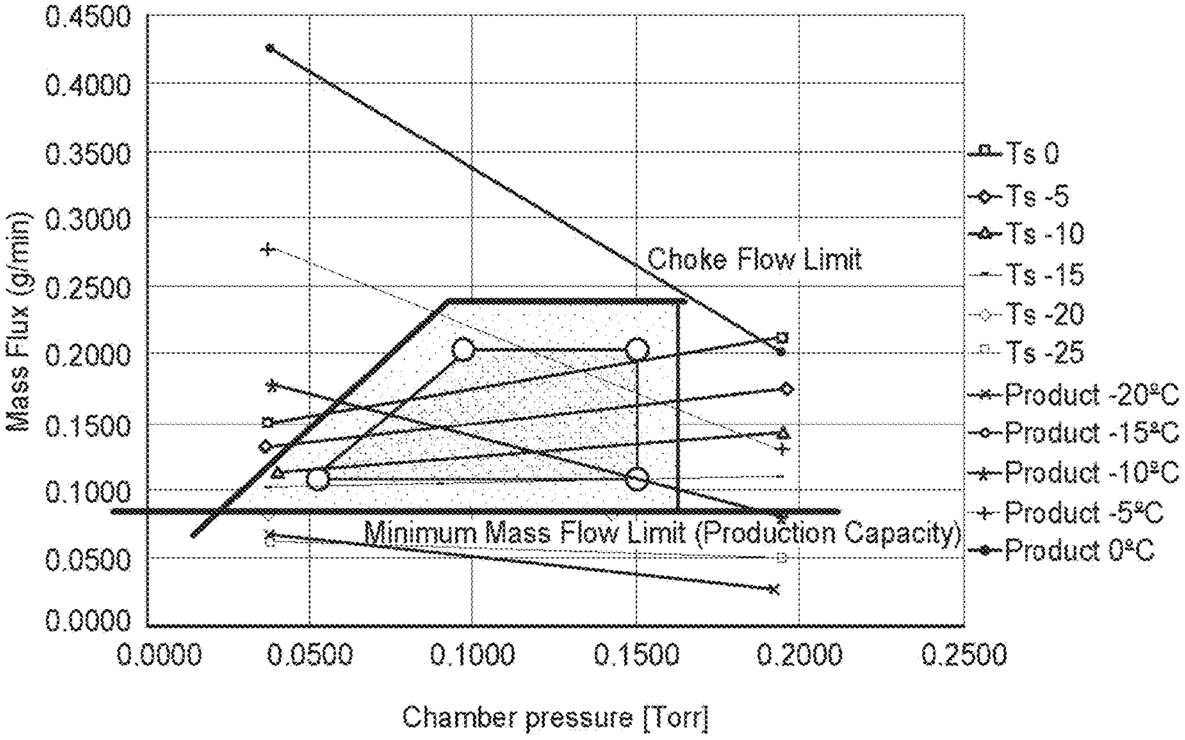

In the context of the present invention, the term design space is understood as the delimitation of the range for each parameter of a freeze-drying process within which it is ensured that the product obtained has the required quality attributes. An example of a productor sample design space can be seen in FIG. 1.

The temperature of the heatable plates (3), the chamber pressure and the weight of said heatable plates (3) are measured at a number of time intervals (for example, at regular time intervals such as every minute, etc.). The values measured at each time interval are applied to a mechanistic combined heat and mass transfer balance model to infer/calculate the conditions in the receptacle suitable for freeze-drying at those time intervals, in addition to calculating the heat transfer coefficient received by the product to be freeze-dried and the resistance constant of the dry product to the passage of vapours, applying these calculated constants to a heat and mass transfer balance model, to represent a 2D or 3D map or graph. This representation is also called design space.

The process conditions or parameters of the sample or of the product in the receptacle suitable for freeze-drying are calculated based on the temperature of the heatable plates (3) and of the product, the pressure, and the weight of the heatable plates (3), measured by sensors/probes inside or outside the freeze-drying chamber.

In another more preferred embodiment of the method of the third aspect and fourth aspect (if necessary) of the invention, the measurement of the variation in weight of the sample in step ii) is carried out by the control unit (10) and gives the value of the vapour mass flux, and wherein the measurement of the variation in weight of the sample in step ii) is determined in response to the variation in weight measured by the strain gauge(s) (9) of the heatable plates (3) comprising the samples and based on the number of samples located on each heatable plate (3).

In another more preferred embodiment of the method of the third and fourth aspects of the invention, the number of samples located on each heatable plate (3) has been previously defined and entered in the control unit (10) or has been obtained by the control unit (10) externally through a server or is manually entered in the control unit (10) by a user.

In another more preferred embodiment of the method of the third and fourth aspects of the invention, the work map of the design space is carried out by the control unit (10) establishing a relationship between the chamber pressure and/or the product temperature and/or the mass flux in the form of a 2D or 3D graph.

Therefore, the creation of the design space of the method of the third aspect has the advantage that it can be used as a reference or model for predicting future values of the conditions in a container suitable for freeze-drying, for example in a vial, during a suitable period of time (e.g., the next hour, the next two hours, etc.), for example to be able to be used in the method of the fourth aspect of the invention.

The construction of said design space in 3D or 2D according to the method of the third aspect also has advantages that make it easier to identify the optimal conditions for a routine freeze-drying process, both on a large scale and in small manufactures, the limits based on which the process can fail and the limits or ranges to perform validations of said manufacturing process.

Moreover, it makes it possible to calculate or estimate the limits of the process control for a configuration of a specific freeze-drying receptacle, equipment, and manufacturing environment. Likewise, the method of the third aspect can be used to predict the effect of variations on process conditions, on the process yield, the time to complete it, and product quality, or to understand the deviations that might occur during manufacturing.

In a preferred embodiment of the method of the third aspect and fourth aspect of the invention, the freeze-drying process of step ii) comprises at least the steps of:

1) freezing the product of step i) in a temperature range between −0 and −60° C.,
2) reducing the pressure in the freeze-drying chamber (2) to a range between 0.9 atm and 0.0002 atm,
3) primary drying of the product obtained in step 2),
4) secondary drying of the product obtained in step 3)
5) sterilizing and
6) optionally discharging the product.

In a preferred embodiment of the method of the third aspect and fourth aspect of the invention, the freeze-drying process of step ii) comprises at least the steps of:

1) freezing the product of step i) in a temperature range between 0 and −60° C.,
2) reducing the pressure in the freeze-drying chamber (2) to values in a range between 0.9 atm and 0.0002 atm,
3) primary drying of the product obtained in step 2) in a temperature range between-50 and 20° C. or between-50 and 40° C.,
4) secondary drying of the product obtained in step 3) in a temperature range between 20 and 70° C. or between 4° and 70° C.
5) sterilizing, and
6) optionally discharging the product obtained in step 4 or 5).

In freeze-drying processes, primary drying removes water by sublimation of ice from the product under vacuum conditions (the product having previously been frozen). By supplying heat, the ice sublimates and passage through the liquid phase is avoided. During primary drying, the water vapour generated in the sublimation interface is eliminated through the pores of the product structure.

Primary drying takes place from the freezing temperature to a temperature range typically between 2° and 40° C.

After the sublimation process is complete, secondary drying is performed to remove any or most of the remaining liquid or moisture. This drying is performed by desorption, evaporating, for example, the non-freezable water found in the previously dried material. In this way, final product moisture results close to and even below 2% can be obtained.

Secondary drying takes place from the temperature at which primary drying is completed to a temperature range between 20 and 70° C. Therefore, when the ice disappears, the free water begins to be eliminated by evaporation, leading to secondary drying.

In another preferred embodiment of the method of the third aspect of the invention, the control unit (10) is configured to establish the relationship between the chamber pressure, the mass flux and the product temperature, and wherein said relationship is represented by the control unit (10) in a 3D or 2D work map. This relationship can be established by applying a mass balance and energy balance during the sublimation process of primary drying. This relationship can be carried out for each different product temperature.

Therefore, in another preferred embodiment, the control unit (10) is configured to establish the relationship between the chamber pressure, the mass flux and the product temperature in a 2D work map at different product temperatures (different product isotherms) during the freeze-drying process.

In another preferred embodiment, the control unit (1O) is configured to establish the relationship between the chamber pressure, the mass flux and the plate temperature in a 2D work map at different plate temperatures during the freeze-drying process.

In another preferred embodiment, the control unit (10) is configured to establish the relationship between the chamber pressure, the mass flux, the different product temperatures (product isotherms) and the different plate temperatures (plate temperature isotherms) in a 2D work map at different plate temperatures during the freeze-drying process.

The heat transfer coefficient between the plate and the product and the resistance coefficient of the dry product to be freeze-dried to the vapour flow are used to establish the relationship between the chamber pressure and the mass flux, for each temperature of each of the heatable plates (3). Said parameters are obtained experimentally and fed to the control unit (10).

To calculate the heat transfer coefficient between the freeze dryer and the product to be freeze-dried (Kv), the following steps are carried out:

1. Filling a container suitable for freeze-drying, for example, a vial with water.
2. Adjusting the plate temperature to reach the desired pressure for each product or sample.
3. Inserting the temperature sensors into the container.
3. Adjusting the temperature of the heatable plates of the freeze dryer to a fixed temperature value.
4. Adjusting the chamber pressure of the freeze dryer to a specific fixed value.
5. Measuring the product temperature values (Tb).
6. Determining the mass flux rate.
7. Calculating Kv.
8. Repeating points 4-8 for the different pressure values comprising the entire working range of the freeze-drying process, to calculate the Kv for the different pressure values by applying the following equation:

Pressure $$K_V = \frac{\left(\Delta H_S \cdot \frac{dm}{dt}\right)}{A_V \cdot (T_s - T_b)}$$

Av=Outer area of the section of the freeze-drying receptacle, for example, outer area of the vial.
Ts=Plate temperature.
Tb=Temperature of the product at the bottom of the vial.
dm/dt=Vapour mass flux
ΔHs=heat of sublimation of ice In this way, a 2D work map can be obtained wherein the different values of Kv are represented compared to the different pressures.

To calculate the resistance coefficient of the dry product to be freeze-dried to the vapour flux (Rp) the following steps are carried out:

1. Filling a container, for example, a vial with the product to be freeze-dried.
2. Inserting the temperature sensors into the container.
3. Adjusting the temperature of the heatable plates of the freeze dryer to a fixed temperature value.
4. Adjusting the chamber pressure of the freeze dryer to a specific fixed value
5. Determining the product temperature values (Tb)
6. Determining the mass flux rate.
7. Calculating Rp. Calculating Rp.
8. Repeating points 4-8 for the different pressure values comprising the entire working range of the freeze-drying process by applying the equation:

$$R_P = \frac{A_P \cdot (P_i - P_c)}{\frac{dm}{dt}}$$

Ap=Inner area of the section of the freeze-drying receptacle, for example, inner area of the vial.
Pi=Vapour pressure of the ice at sublimation.
Pc=Chamber pressure.
Pi=f (Tb) Equilibrium tables In this way, a 2D work map (graph) can be obtained wherein the different values of Rp can be represented compared to different chamber pressures.

Once the values of Kv and Rp are characterised, the different points that will configure the plate temperature and product temperature isotherms can be calculated for the different values of the plate temperature, Ts. For example, using each value of Tb and dm/dt to represent the different plate temperature isotherms.

Figure 2A:
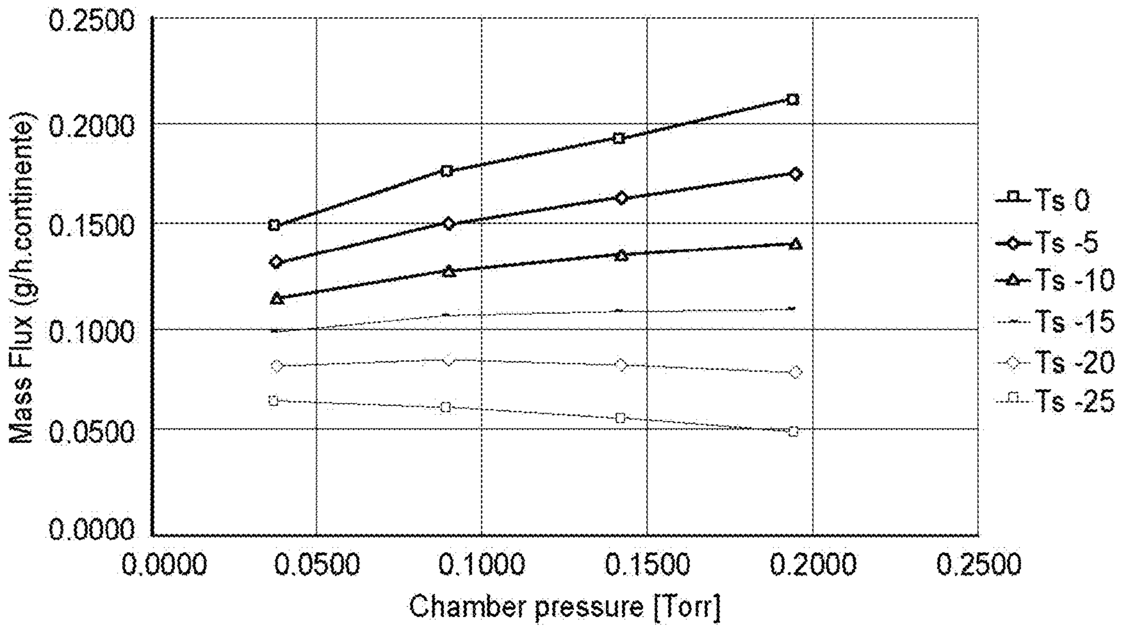
Figure 2B:
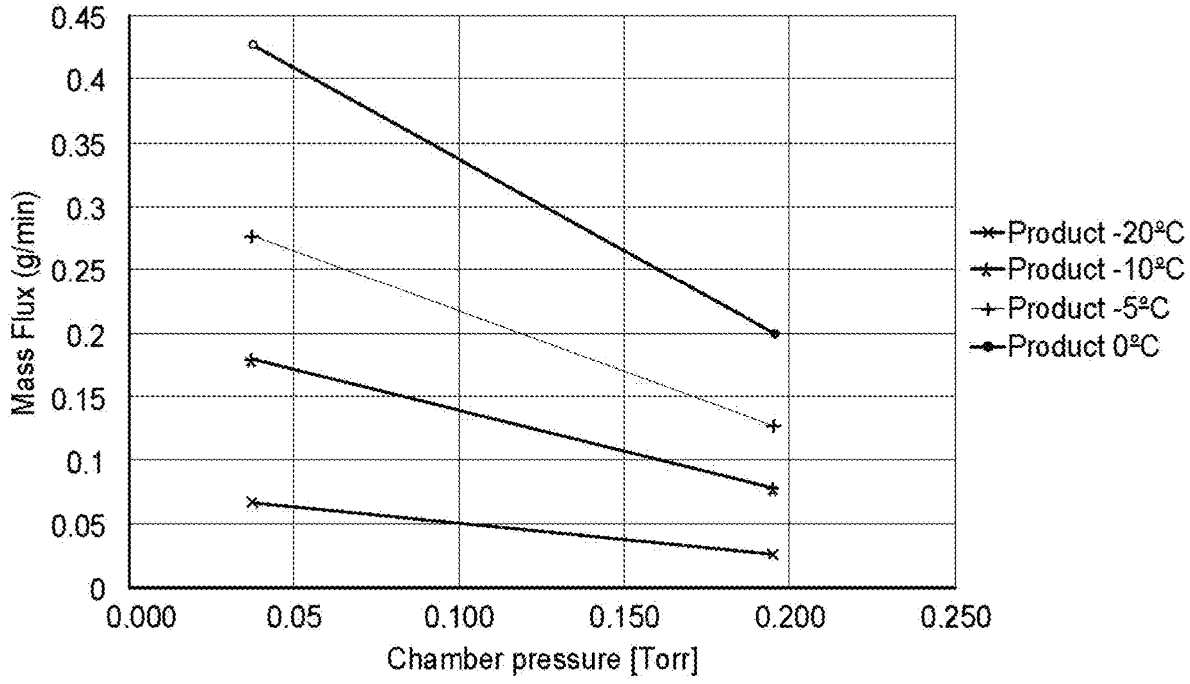

In a preferred embodiment, to establish the relationship between the chamber pressure, the mass flux and the product temperature, (product temperature isotherms), as seen in FIGS. 2A and 2B, the following steps are carried out:

1. Selecting a product temperature (Tb) and chamber pressure (Pc) and calculating the sublimation rate (dm/dt), using the equation:

$$dm/dt=(Pi-Pc)/Rp$$

$$Pi=f(Tb)(\text{equilibrium})$$

2. Repeating the calculation for different values of the chamber of Pc.
3. Drawing the line on the graph.
4. Repeating the operation for other product temperature values, Tb.

In a preferred embodiment of the method of the third aspect of the invention, the method comprises an additional step once the design space has been established; this additional step comprises establishing the limits of the design space.

Figure 3:
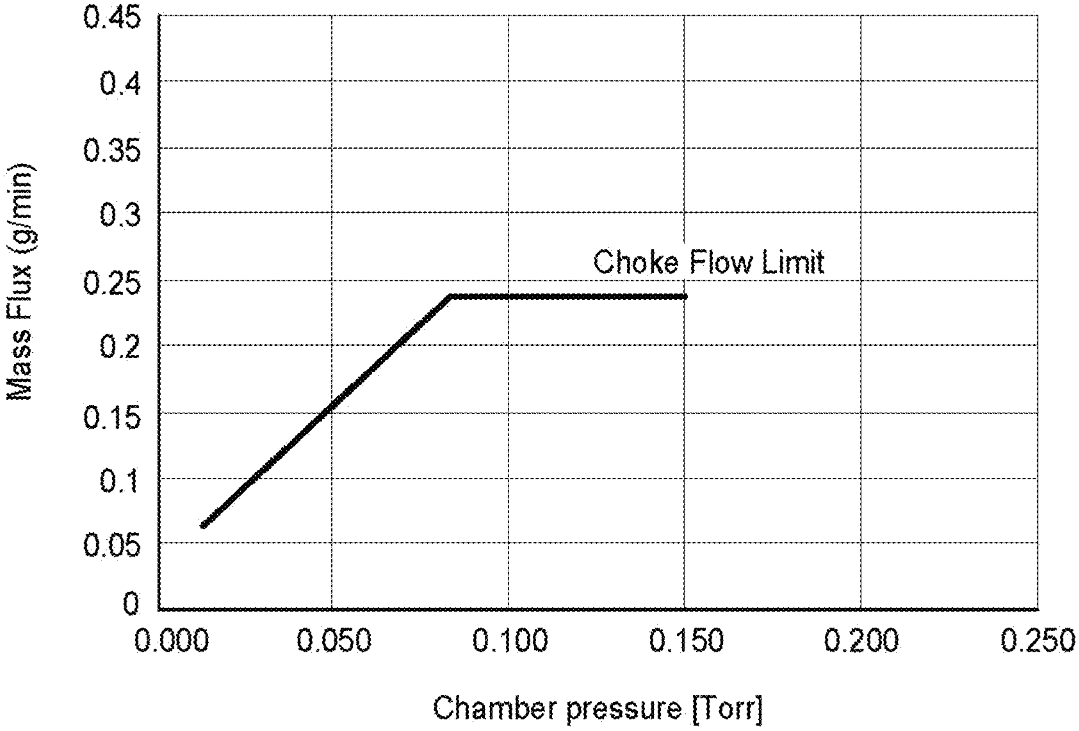
FIG. 3 is a work map (graph) that represents the choke flow limits or choke point of the freeze dryer.
Figure 4:
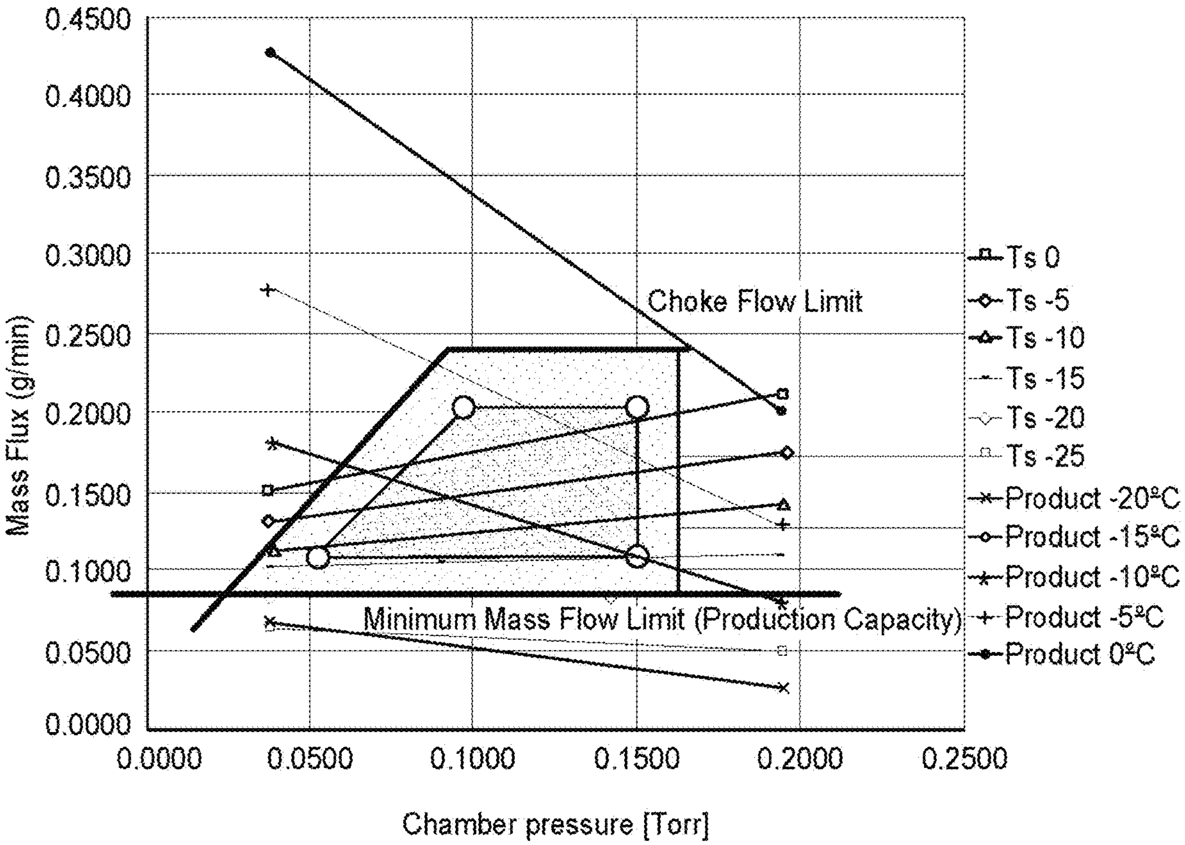
FIG. 4 is a work map (graph) that represents the choke flow, together with the product and plate temperature isotherms.

In another preferred embodiment of the method of the third aspect, it comprises an additional step vii) where the limits of the design space are established, which comprises establishing the maximum limits of the evaporation mass flux rate (Choke Flow or Choke Point) allowed by the freeze-drying equipment based on the pressure measured by the pressure sensors (6) and the critical product temperature. In another more preferred embodiment, the control unit (1O) is configured to establish the Choke Flow In the context of the present invention, the process for establishing the maximum limits of the evaporation mass flux rate allowed by the freeze-drying equipment based on the pressure of the freeze-drying chamber is called the Choke Point or Choke Flow. An example of a design space representing the established Choke Flow is shown in FIGS. 3 and 4.

In a preferred embodiment of the method of the invention, the Choke Point or Choke Flow) the following steps are carried out:

1.—Filling the freeze dryer with water to a known height.
2.—Freezing at −40° C.
3.—Preparing the system to start primary drying.
4.—Performing primary drying at different chamber pressures.
5.—Verifying the maximum vapour flow rate that can be attained at each chamber pressure.

The critical temperature of the product is a parameter used to establish said limits. Preferably, the critical temperature is determined at least by a method of analysis selected from the list consisting of DSC (Differential Scanning calorimetry), TGA (Thermogravimetric Analysis) or FDM (Freeze-Drying Microscopy). Specifically, the critical temperature is a relevant parameter for designing the primary drying phase of a freeze-drying cycle.

To determine the critical temperature of the product, the maximum product temperature allowed during primary drying is determined; this temperature can be the collapse temperature in the case of an amorphous product or the melting temperature in the case of a crystalline product. The critical temperature is necessary to establish the maximum temperature allowed for the product in primary drying. The critical temperature of primary drying is a parameter that is fed to the control unit (1O) to carry out step vi). In a preferred embodiment of the method of the third aspect of the invention, the control unit (1O) is configured to establish the relationship between the chamber pressure and the mass flux, for the temperature of the heatable plates (3), for example by using the average values obtained by the control unit (10) in the event that more than one temperature sensor of plates (3) present in the freeze dryer is used and wherein said relationship is represented by the control unit (1O) in a 20 work map at the different temperatures of the heatable plates (3) during the freeze-drying process.

The fourth aspect of the invention relates to a suitable freeze-drying method that contains a product, routinely during a freeze-drying process inside a freeze-drying chamber (2) of a freeze-dryer (1), which comprises the system according to the first aspect, preferably the freeze dryer (1) according to any of claims 23 and 24, wherein said method comprises at least the following steps:

vii. depositing a sample to undergo a freeze-drying process inside said chamber (14);
viii. carrying out a freeze-drying process on said product;
ix. optionally measuring the variation in weight of the sample by using at least one strain gauge (9) at different time intervals throughout the freeze-drying process of step ii);
x. measuring the temperature of the heatable plates (3) by using temperature sensors (7) at different time intervals throughout the freeze-drying process of step ii);
xi. optionally measuring the temperature of the product of the sample by using temperature sensors (8) at different time intervals throughout the freeze-drying process of step ii);
xii. measuring the absolute pressure inside the freeze-drying chamber at different time intervals throughout the freeze-drying process of step ii);

wherein steps iii), iv), v) and vi) are carried out simultaneously in real time to provide measurements of chamber pressure, temperature of the heatable plates (3), product temperature, and weight variation of the samples, and wherein said measurements are collected by a control unit (1O) and at least one of said measurements or the parameters obtained through said measurements by the control unit (10) are represented by a display device (12), on a work map, wherein the work map comprises at least the representation in graphs of said measurements collected by the control unit (10) or of the parameters obtained by the control unit (10), and wherein said graphs represent at least one of the measurements or parameters;

c. comparing, by using the control unit (10), at least the measurements of temperature of the heatable plates (3) and pressure obtained in the work map for each product during step ii) against values previously obtained in the design space according to the third aspect, for a sample or standard sample, during that same step ii);

d. optionally adjusting, if necessary, the absolute pressure and temperature parameters in the freeze dryer for each process, via the control unit (10) based on the results of step e) that deviate from the results obtained for the design space for the sample or standard sample.

In a preferred embodiment of the method of the fourth aspect of the invention, the control unit (10) is configured to apply the pressure values obtained and the heat transfer coefficient between the freeze dryer and the product to be freeze-dried measured at different chamber pressures, and/or the resistance coefficient of the dry product to be freeze-dried to the vapour flow measured at different chamber pressures, as inputs to a heat and mass transfer model in order to calculate the mass flux inside the freeze-drying chamber at different times and at different product temperatures in a 2D or 3D work map.

In a preferred embodiment of the method of the fourth aspect of the invention, the control unit (1O) is configured to subsequently establish the relationship between the chamber pressure, the mass flux and the product temperature in a 2D or 3D work map at different product temperatures.

The invention claimed is:

1. A system suitable for controlling a freeze-drying process in a freeze dryer including a freeze-drying chamber with a hanging plate stack system comprising several heatable plates, wherein said system comprises:

I. at least one pressure sensor adapted for detecting an absolute pressure in the freeze-drying chamber;

II. at least one temperature sensor adapted for measuring a temperature of each heatable plate;

III. at least one product temperature sensor adapted for measuring a temperature of a product deposited in a receptacle suitable for freeze-drying, loaded on a heatable plate, wherein said at least one product temperature sensor being located inside said receptacle suitable for freeze-drying;

IV. several resistance strain gauge weighing sensors adapted for measuring variations in weight of products loaded on each heatable plates at different time intervals throughout a freeze-drying process;

V. a control unit comprising a processor and a display device, wherein the control unit is configured to automatically and simultaneously collect and analyze at least measurements from the at least one pressure sensor, from the at least one temperature sensor, from the at least one product temperature sensor and from the several resistance strain gauge weighing sensors, which sensors, and are in data connection with the control unit through an electronic module and represent at least one of said measurements on a display device on a work map, characterized in that the hanging plate stack system further comprises an upper pressing plate and each of the heatable plates of the hanging plate stack system are movable, and the heatable plates hang either from another heatable plate of the hanging plate stack system or from the upper pressing plate, wherein each heatable plate of the hanging plate stack is coupled to each other or to the upper pressing plate by a mechanical connection and wherein each of the resistance strain gauge weighing sensors is configured to be coupled to an upper portion of the mechanical connection.

2. The system according to claim 1 wherein the resistance strain gauge sensors are configured to be located in an upper portion of each heatable plate and/or of the upper pressing plate.

3. The system according to claim 2 wherein upper ends of the mechanical connection are configured to pass through the heatable plates or through the upper pressing plate.

4. The system according to claim 1, wherein the freeze dryer includes a top piston adapted to move the plate stack raising and lowering all the heatable plates and the upper pressing plate closing receptacles loaded on the heatable plates, the receptacles containing said products.

5. The system according to claim 1, comprising at least two resistance strain gauge weighing sensors for each heatable plate, preferably at least four resistance strain gauge weighing sensors for each heatable plate.

6. The system according to claim 1, wherein each resistance strain gauge weighing sensor is configured to be coupled to an upper portion of the mechanical connection through a compression force transmission structure.

7. The system according to claim 1, wherein the control unit is external to the freeze dryer and the processor is selected from a CPU or a PLC unit.

8. The system according to claim 1, wherein the system has two control units, a control unit external to the freeze dryer and another control unit connected to the freeze dryer, both in data connection with the pressure sensor, with the temperature sensor, with the product temperature sensor and with the resistance strain gauge weighing sensors, and wherein the control unit external to the freeze dryer is in data connection with the control unit of the freeze dryer through the processor.

9. The system according to claim 1, further comprising at least one aggregating box configured to unify an input signal of each resistance strain gauge weighing sensors into a single output signal towards the control unit.

10. The system according to claim 9, wherein the aggregating box is an analogue adding box or a digital adding box and/or is located external to the freeze dryer.

11. The system according to claim 1, wherein the plate and product temperature sensors are selected from a list consisting of thermocouples and PT I 00-type sensors.

12. The system according to claim 1, wherein the system comprises at least one plate temperature sensor located on a heating means collector before entering the heatable plates; the system preferably further comprises at least one plate temperature sensor for each heatable plate.

13. The system according to claim 12, wherein the plate temperature sensor located on a heatable plate is configured to be placed inside the heatable plates.

14. The system according to claim 1, wherein the heating collector is a thermal fluid heating collector and wherein the temperature sensor is configured to be placed on said heating collector.

15. The system according to claim 1, wherein the system comprises at least one product temperature sensor located in at least one receptacle suitable for freeze-drying, preferably wherein the system comprises one product temperature sensor per heatable plate.

16. The system according to claim 1, wherein the product temperature sensors are configured to be deposited inside receptacles suitable for freeze-drying; the product temperature sensors being preferably wireless.

17. The system according to claim 1, wherein the electronic module is wireless or digital.

18. The system according to claim 1, wherein the temperature sensors and the corresponding electronic module are wireless.

19. The system according to claim 16, wherein wireless temperature sensors have a memory for storing data, a battery and an antenna configured to communicate the data to the control unit; the antenna is preferably configured to emit a radio signal.

20. The system according to claim 1, wherein the pressure sensor is a capacitive or Pirani-type sensor; it is preferably a pressure sensor suitable for withstanding temperatures in a range between −60 and 130° C. and/or being configured to measure pressures between 0.01 and I mbar.

21. The system according to claim 1, wherein the pressure sensor is configured to be located inside the freeze-drying chamber and connected to the control unit by the electronic module.

22. A method suitable for generating a design space for a sample, comprising receptacles suitable for freeze-drying which contain a product, during a freeze-drying process inside a freeze-drying chamber of a freeze dryer which comprises the system according to claim 1, wherein said method comprises:

i. depositing a sample of the product to undergo a freeze-drying process inside said chamber;

ii. carrying out a freeze-drying process on said product;

iii. measuring a variation in weight of the sample by using resistance strain gauge weighing sensors at different time intervals throughout the freeze-drying process of step ii);

iv. measuring the temperature of the heatable plates by using temperature sensors at different time intervals throughout the freeze-drying process of step ii);

v. measuring the temperature of the sample by using temperature sensors at different time intervals throughout the freeze-drying process of step ii);

vi. measuring an absolute pressure inside the freeze-drying chamber at different time intervals throughout the freeze-drying process of step ii);

wherein steps iii), iv), v) and vi) are carried out simultaneously in real time to provide measurements of chamber pressure, temperature of the heatable plates, product temperature, and variation in weight of the samples, and wherein said measurements are collected by a control unit and at least one of said measurements or parameters obtained through said measurements by the control unit are represented by a display device, on a work map, wherein the work map comprises at least the representation in graphs of said measurements collected by the control unit or of the parameters obtained by the control unit, and wherein said graphs represent at least one of the measurements or parameters and optionally establishing limits of the design space, and wherein the graphs of the work map represent at least two and/or three of the measurements collected by the control unit and the parameters obtained through said measurements by the control unit, and wherein the freeze-drying process of step ii) comprises at least following steps:

a) freezing the sample of step i) in a temperature range between −0 and −60° C., b) reducing the pressure in the freeze-drying chamber to a range between 0.9 atm and 0.0002 atm, c) primary drying of the product obtained in step b), d) secondary drying of the product obtained in step c) and e) optionally discharging the product, the method being characterized by comprising an additional step vii) which comprises establishing limits of the design space, comprising:

1. establishing maximum limits of an evaporation mass flux rate allowed by the freeze-drying equipment based on the pressure measured by the pressure sensors during steps b), c) and d) of the freeze-drying process, and 2. determining a critical product temperature.

23. The method according to claim 22, wherein the control unit is configured to establish the maximum limits of the evaporation mass flux rate of section 1.

24. The method according to claim 22, wherein the critical temperature of the product is determined at least by a method selected from a list consisting of DSC, TGA and FDM and said temperature is fed to the control unit.

25. The method according to claim 22, wherein the measurement of the variation in weight of the sample in step iii) is carried out by the control unit and gives a value of vapour mass flux and wherein the measurement of the variation in weight of the sample in step iii) is determined in response to a variation in weight measured by the resistance strain gauge weighing sensors of the heatable plates comprising the samples and based on a number of samples located on each heatable plate.

26. The method according to claim 25, wherein the number of samples located on each heatable plate has been previously defined and entered into the control unit or has been obtained by the control unit externally through a server or is manually entered in the control unit by a user.

27. The method according to claim 22, wherein the control unit is configured to establish a relationship between the chamber pressure and the mass flux rate, for each temperature of each of the heatable plates present in the freeze dryer and wherein said relationship is represented by the control unit in a 2D work map at different temperatures to which each of the heatable plates is subjected during the freeze-drying process.

28. The method according to claim 22, wherein the receptacle suitable for freeze-drying of the sample is selected from a list consisting of vials, ampoules, syringes, cartridges, bulk trays, microtubes and flasks.

29. A method for monitoring and controlling a sample comprising receptacles suitable for freeze-drying which contain a product, routinely during a freeze-drying process inside a freeze-drying chamber of a freeze dryer which comprises the system according to claim 1, wherein said method comprises at least the following steps:

xiii. depositing a sample of the product to undergo a freeze-drying process inside said chamber;

xiv. carrying out a freeze-drying process on said product;

xv. optionally measuring a variation in weight of the sample by using resistance strain gauge weighing sensors at different time intervals throughout the freeze-drying process of step xiv);

xvi measuring the temperature of the heatable plates by using temperature sensors at different time intervals throughout the freeze-drying process of step xiv);

xvii. optionally measuring the temperature of the sample by using temperature sensors at different time intervals throughout the freeze-drying process of step xiv);

xviii. measuring an absolute pressure inside the freeze-drying chamber at different time intervals throughout the freeze-drying process of step xiv);

wherein steps xv, xvi, xii and xviii) are carried out simultaneously in real time to provide measurements of chamber pressure, temperature of the heatable plates, product temperature, and weight variation of the samples, and wherein said measurements are collected by a control unit and at least one of said measurements or parameters obtained through said measurements by the control unit are represented by a display device, on a work map, wherein the work map comprises at least the representation in graphs of said measurements collected by the control unit or of parameters obtained by the control unit, and wherein said graphs represent at least one of the measurements or parameters; and comparing, by using the control unit, at least the measurements of temperature of the heatable plates and pressure obtained in the work map for each product during step xiv) against values previously obtained in a design space according to the third aspect, for a sample or standard sample, during that same step xiv);

optionally adjusting, if necessary, the absolute pressure and temperature parameters in the freeze dryer for each process, via the control unit based on the results of step e) xviii that deviate from the results obtained for the design space for the sample or standard sample, wherein the control unit is configured to apply the pressure values obtained and a heat transfer coefficient between the freeze dryer and the product to be freeze-dried measured at different chamber pressures, and/or a resistance coefficient of a dry product to be freeze-dried to a vapour flow measured at different chamber pressures, as inputs to a heat and mass transfer model in order to calculate a mass flux inside the freeze-drying chamber at different times and at different product temperatures in a 2D or 3D work map, the method for monitoring and controlling a sample being characterized in that the control unit is configured to subsequently establish a relationship between the chamber pressure, the mass flux and the product temperature in a 2D or 3D work map at different product temperatures.

30. The method according to claim 25, wherein the number of samples located on each heatable plate has been previously defined and entered in the control unit or has been obtained by the control unit externally through a server or is manually entered in the control unit by a user.

31. The method according to claim 22, wherein the control unit is configured to establish the relationship between the chamber pressure and the mass flux, for each temperature of each of the heatable plates present in the freeze dryer and wherein said relationship is represented by the control unit in a 2D work map at the different temperatures to which each of the heatable plates is subjected during the freeze-drying process.

32. The method according to claim 22, wherein the receptacle suitable for freeze-drying of the sample is selected from the list consisting of vials, ampoules, syringes, cartridges, bulk trays, microtubes and flasks.

33. A method for monitoring and controlling a sample comprising receptacles suitable for freeze-drying which contain a product, routinely during a freeze-drying process inside a freeze-drying chamber of a freeze dryer which comprises the system according to claim 1, wherein said method comprises at least the following steps:

xvi. depositing a sample to undergo a freeze-drying process inside said chamber;

xvii. carrying out a freeze-drying process on said product;

xviii. optionally measuring the variation in weight of the sample by using resistance strain gauge weighing sensors at different time intervals throughout the freeze-drying process of step xiv);

xvi measuring the temperature of the heatable plates by using temperature sensors at different time intervals throughout the freeze-drying process of step xiv);

xv11. optionally measuring the temperature of the product of the sample by using temperature sensors at different time intervals throughout the freeze-drying process of step xiv);

xv111. measuring the absolute pressure inside the freeze-drying chamber at different time intervals throughout the freeze-drying process of step xiv);

wherein steps xv, xvi, xii and xviii) are carried out simultaneously in real time to provide measurements of chamber pressure, temperature of the heatable plates, product temperature, and weight variation of the samples, and wherein said measurements are collected by a control unit and at least one of said measurements or the parameters obtained through said measurements by the control unit are represented by a display device, on a work map, wherein the work map comprises at least the representation in graphs of said measurements collected by the control unit or of the parameters obtained by the control unit, and wherein said graphs represent at least one of the measurements or parameters; and comparing, by using the control unit, at least the measurements of temperature of the heatable plates and pressure obtained in the work map for each product during step xiv) against values previously obtained in the design space according to the third aspect, for a sample or standard sample, during that same step xiv);

optionally adjusting, if necessary, the absolute pressure and temperature parameters in the freeze dryer for each process, via the control unit based on the results of step e) that deviate from the results obtained for the design space for the sample or standard sample, wherein the control unit is configured to apply the pressure values obtained and the heat transfer coefficient between the freeze dryer and the product to be freeze-dried measured at different chamber pressures, and/or the resistance coefficient of the dry product to be freeze-dried to the vapour flow measured at different chamber pressures, as inputs to a heat and mass transfer model in order to calculate the mass flux inside the freeze-drying chamber at different times and at different product temperatures in a 2D or 3D work map, the method for monitoring and controlling a sample being characterized in that the control unit is configured to subsequently establish the relationship between the chamber pressure, the mass flux and the product temperature in a 2D or 3D work map at different product temperatures.

* * * * *